Figure 1:
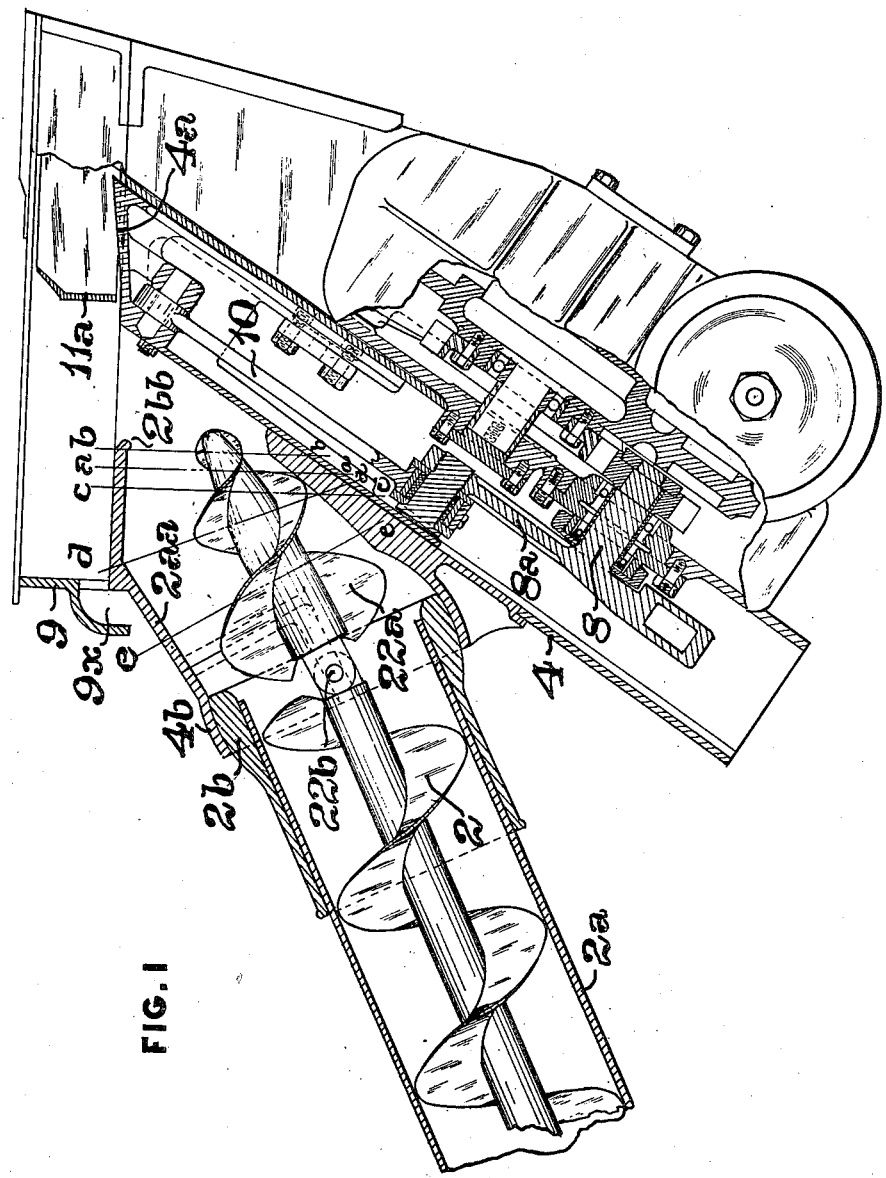

A. B. FAHNESTOCK.
CONVEYING APPARATUS FOR MECHANICAL STOKERS.
APPLICATION FILED JUNE 13, 1922.

1,436,870.

Patented Nov. 28, 1922.
3 SHEETS—SHEET 1.

WITNESSES

INVENTOR

A. B. FAHNESTOCK.
CONVEYING APPARATUS FOR MECHANICAL STOKERS.
APPLICATION FILED JUNE 13, 1922.

1,436,870.

Patented Nov. 28, 1922.

3 SHEETS—SHEET 3.

Patented Nov. 28, 1922.

1,436,870

UNITED STATES PATENT OFFICE.

ADAM B. FAHNESTOCK, OF MANHASSET, NEW YORK, ASSIGNOR TO ELVIN MECHANICAL STOKER COMPANY, OF NEW YORK, N. Y., A CORPORATION OF DELAWARE.

CONVEYING APPARATUS FOR MECHANICAL STOKERS.

Application filed June 13, 1922. Serial No. 567,908.

*To all whom it may concern:*

Be it known that I, ADAM B. FAHNESTOCK, a citizen of the United States, and resident of Manhasset, in the county of Nassau and State of New York, have invented a certain new and useful Improvement in Conveying Apparatus for Mechanical Stokers, of which improvement the following is a specification.

My invention relates to mechanical stokers, of the general class or type of that disclosed in Letters Patent of the United States No. 1,267,644, granted and issued to Albert G. Elvin and Frank H. Clark, jointly with myself, under date of May 28, 1918. In the mechanical stoker set forth in said Letters Patent, fuel is carried from the tender of a locomotive by a screw conveyor, rotating in a casing, to a reciprocating elevator, by which it is delivered to a pair of fuel carrying and throwing shovels, which project it into, and distribute it in, the firebox of the locomotive.

The object of my present invention is to provide a conveying apparatus by which a more effective delivery of fuel from the screw conveyor to the elevator may be ensured, and to reduce the amount of work imposed upon the screw conveyor in practical service.

The improvement claimed is hereinafter fully set forth.

In mechanical stokers constructed in substantial accordance with Letters Patent No. 1,267,644, it has been the practice to terminate the screw conveyor about six or eight inches from the elevator, the coal forward of the end of the screw conveyor being pushed by the coal which is in contact therewith, in a continuous traverse to the elevator, through the space within the conveyor casing which is unoccupied by the screw conveyor, and through an adjoining delivery space of triangular section, termed, in the specification of the patent, a "pocket". The spaces referred to were provided in the enclosing members of the conveying apparatus of the mechanical stoker, to counteract the tendency of the screw conveyor to deliver a greater portion of the bulk of the fuel to the right side of the elevator, when turning to the left, or to the left side if turning to the right, but the provision of these spaces has been found to involve the objection of causing the final portion of the thread of the screw conveyor to work in a larger body of fuel than that which was normal, in order that the coal in front of, and therefore out of contact with, the thread, should be pushed forward by the fuel which was directly acted on thereby.

The objectionable result above stated is entirely avoided under my present invention by the substitution, in the conveying apparatus, of a supplemental screw conveyor and casing, effecting the traverse of the fuel directly to the elevator, for the prior open spaced enclosing members, to wit: the portion of the conveyor casing which is unoccupied by the screw, and the adjoining space interposed between said portion and the elevator.

Figure 2:
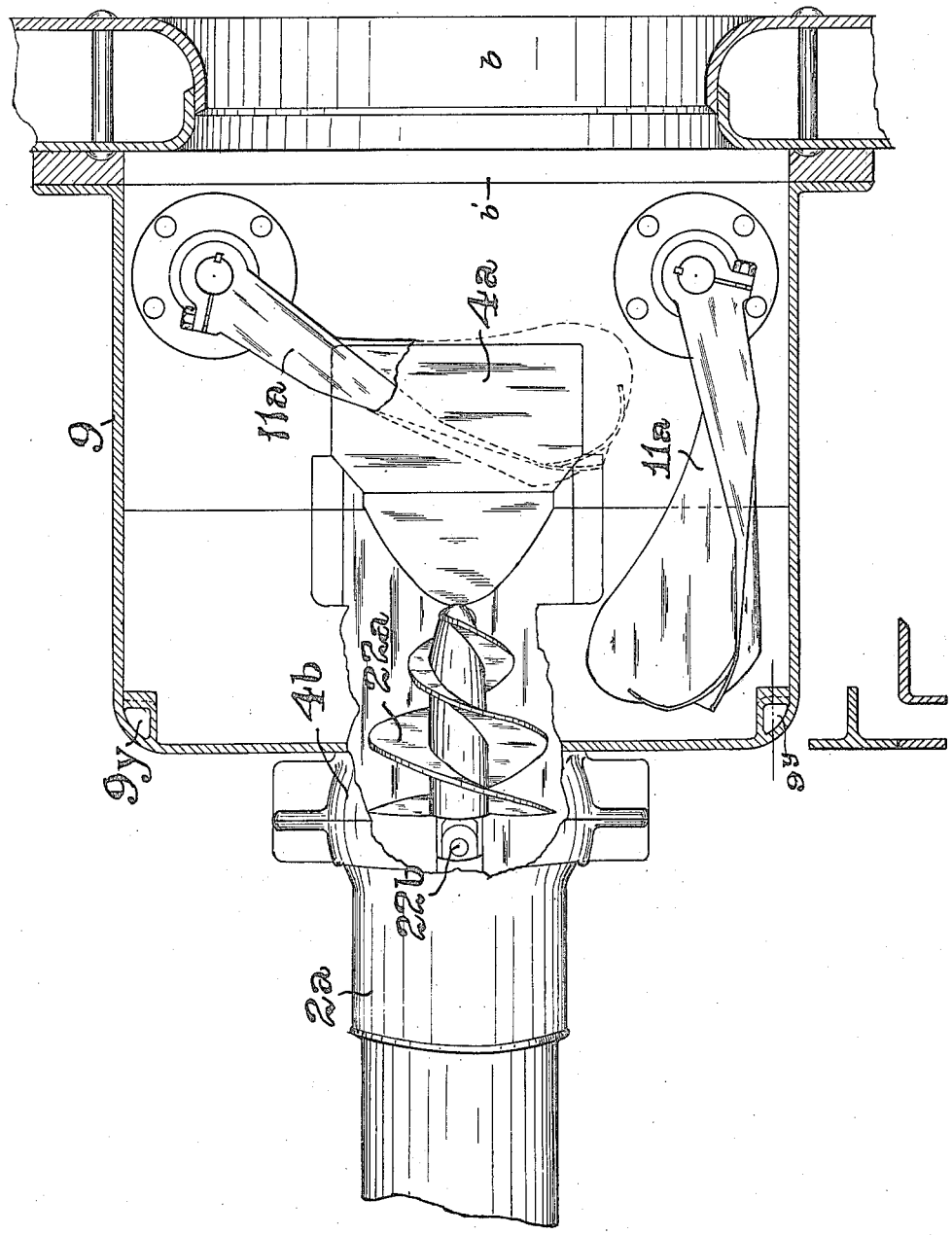
Figure 3:
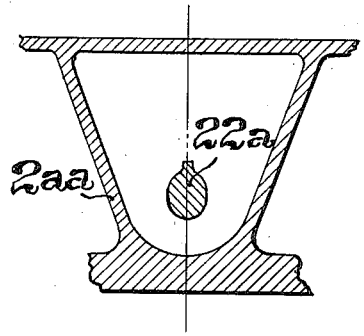
Figure 4:
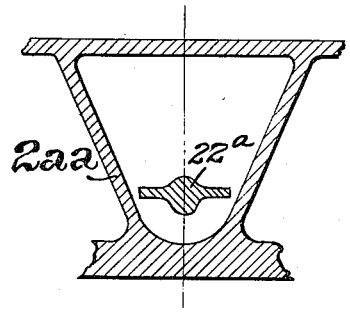
Figure 5:
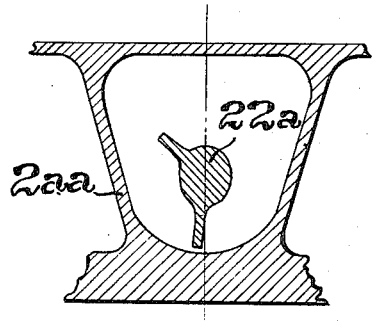
Figure 6:
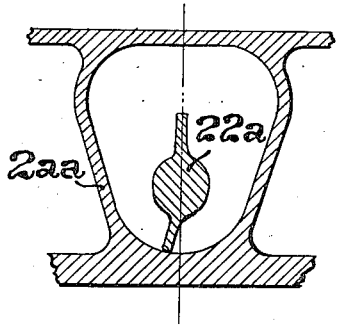
Figure 7:
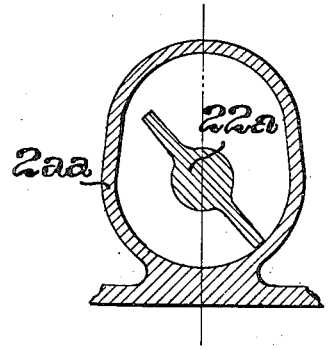

In the accompanying drawings: Figure 1 is a vertical longitudinal central section through the forward portion of the conveying apparatus, and the shovel box, of a mechanical stoker, illustrating an application of my invention; Fig. 2, a plan view of the shovel box; and, Figs. 3, 4, 5, 6 and 7, transverse sections, on the lines $a\,a$, $b\,b$, $c\,c$, $d\,d$ and $e\,e$, respectively, of Fig. 1.

In the practice of my invention, referring descriptively to the specific embodiment thereof which is herein exemplified, a screw conveyor, 2, and an inclined conveyor casing, $2^a$, in which it is rotated, are, as in Letters Patent No. 1,267,644, aforesaid, provided as the preliminary members of the conveying apparatus, by which the fuel is transferred from the tender of the locomotive to the mechanism whereby it is supplied to the firebox thereof. The conveyor casing, $2^a$, is articulated, by a ball joint member, $2^b$, to a socket, $4^b$, secured to a superposed shovel box, 9, in which two fuel carrying and throwing shovels, $11^a$, $11^a$, are mounted to swing, in alternately opposite directions, on vertical axes, and operate to throw the fuel, through the firing door opening, $b'$, into the firebox, $b$, of the locomotive, and properly distribute it therein.

The ball joint socket, $4^b$, is formed integral with a casing, $2^{aa}$, extending upwardly and inclined at a greater angle than the casing, $2^a$, and open, at its upper end, to the casing, 4, of a reciprocating plunger elevator, $4^a$, which is upwardly and forwardly inclined, at a greater angle than that of the conveyor casing, $2^a$. Reciprocating movement is imparted to the elevator, $4^a$, through a connecting rod, 10, coupled to a crank, 8ª, on a shaft, 8, journalled in the lower part of the elevator casing, and rotated by mechanism which does not form part of my present invention, and is not, therefore, herein set forth.

A supplemental screw conveyor, 22ª, is coupled, by a universal joint, 22ᵇ, to the upper end of the preliminary conveyor, 2, and extends therefrom, through the casing, 2ᵃᵃ, to, or nearly to, the forward end thereof, which, as before stated, is open to the elevator casing, 4. The shaft of the supplemental conveyor, 22ª, is preferably tapered to a smaller diameter at its upper end, and the thread of the conveyor is likewise gradually reduced in diameter from its lower to its upper end, as shown in Fig. 1. The supplemental conveyor is also preferably provided with a double thread, the pitch of which may be greater than that of the thread of the preliminary screw conveyor.

The top of the supplemental conveyor casing, 2ᵃᵃ, constitutes the rear portion of the floor of the shovel box, 9, and in order to deflect any fuel that might tend to be moved upwardly to the shovel box, a downwardly turned lip, 2ᵇᵇ, is formed at the top of the front end of the casing, 2ᵃᵃ. As shown in Figs. 3, 4, 5, 6 and 7, the bottom of said casing is substantially semi-circular, and concentric with the axis of the supplemental conveyor, 22ª, and the transverse section of the casing varies in form, being approximately circular at its junction with the socket, 4ᵇ, and changing to semi-circular below its axis, and outwardly tapering above it, as it extends towards its upper end, the top of the casing being widened out, to provide clearance for the supplemental conveyor screw in the event of its being lifted off the bottom of the casing, and to enable a suitable junction to be made with the shovel box. The fuel being delivered centrally to the elevator, from the open upper end of the supplemental conveyor casing, 2ᵃᵃ, the tendency for delivery to a greater extent on the side opposite the lead of the conveyor screw is minimized.

In order to prevent any accidental accumulation of fine fuel at the back and sides of the shovel box, an air opening, 9ˣ, is formed therein, through which air will be drawn into the shovel box by the draft exerted by the exhaust blast on the firebox when the locomotive is running under steam, which draft will carry away any small particles of fuel out of the shovel box, preventing their accumulation on the floor thereof. The back corners of the shovel box may also be provided with air openings, 9ʸ, for similarly preventing accumulation of fine fuel behind the shovels.

It will be seen that in a conveying apparatus constructed and operated substantially as hereinbefore described, the space between the upper end of the conveyor and the elevator, which, in the apparatus disclosed in Letters Patent No. 1,267,644 aforesaid, was entirely free and unoccupied, and through which, as the avenue of traverse of the fuel from the conveyor to the elevator, the fuel passing through it was pushed forward by the fuel behind it, on which the conveyor directly acted, is now utilized for the reception of a supplemental conveying apparatus, which directly acts on the fuel to effect its forward movement through the former unoccupied space, and its central delivery to the elevator, the advantages of which will be obvious to those familiar with the operation of mechanical stokers of the type to which my invention relates.

I claim as my invention and desire to secure by Letters Patent:

1. In a conveying apparatus, for mechanical stokers, the combination of an inclined conveyor casing; a screw conveyor, adapted to be rotated therein; a supplemental conveyor casing, articulated, by a ball joint, thereto; a supplemental screw conveyor, fitted in said last specified casing and actuated by the preliminary screw conveyor; and means for transferring fuel directly from the supplemental conveyor screw to a higher delivery level.

2. In a conveying apparatus for mechanicay stokers, the combination of an inclined conveyor casing; a screw conveyor, adapted to be rotated therein; a supplemental conveyor casing, articulated, by a ball joint, thereto; a supplemental screw conveyor, fitted in said last specified casing, and actuated by the preliminary screw conveyor; means for elevating fuel, supplied directly by the supplemental screw conveyor; and means for projecting the elevated fuel into a firebox.

3. In a conveying apparatus for mechanical stokers, the combination of an inclined conveyor casing; a screw conveyor, adapted to be rotated therein; a supplemental conveyor casing, articulated, by a ball joint, thereto; a supplemental screw conveyor fitted in said last specified casing; and actuated by the preliminary screw conveyor; an elevator casing in continuous open communication with the supplemental conveyor casing; an elevator, adapted to be reciprocated in the elevator casing; and means for projecting coal from said elevator into a firebox.

4. In a conveying apparatus for mechanical stokers, the combination of an inclined conveyor casing; a screw conveyor, adapted to be rotated therein; a supplemental conveyor casing, articulated, by a ball joint, thereto; a supplemental screw conveyor, fitted in the supplemental conveyor casing; a universal joint, coupling the preliminary and supplemental screw conveyors; an elevator casing, to which the supplemental conveyor is open at its delivery end; and an elevator, adapted to be reciprocated in the elevator casing.

5. In a conveying apparatus for mechanical stokers, the combination of an inclined conveyor casing, having a ball member on its upper end; an elevator casing; a supplemental conveyor casing, interposed between the preliminary conveyor casing and the elevator casing, and having a socket at one of its ends, fitting the ball member of the preliminary conveyor casing, and open at its opposite end, to the elevator casing; screw conveyors, adapted to be coincidently rotated in the preliminary and supplemental conveyor casings; and an elevator, adapted to be reciprocated in the elevator casing.

6. In a conveying apparatus for mechanical stokers, the combination of an inclined preliminary conveyor casing; a supplemental conveyor casing, articulated, by a ball joint, thereto, and having a portion of the wall of its top formed into a section of a shovel box floor; a shovel box, secured to said floor section; an elevator casing, secured to the lower portion of the wall of the supplemental conveyor casing, and in open communication with said casing; an elevator, adapted to reciprocate in the elevator casing, and to transfer fuel from the supplemental conveyor casing to the shovel box; and screw conveyors, adapted to be coincidently rotated in the preliminary and supplemental conveyor casings.

7. In a conveying apparatus for mechanical stokers, the combination of an inclined preliminary conveyor casing; a supplemental conveyor casing, articulated, by a ball joint, thereto, and having a portion of the wall of its top formed into a section of a shovel box floor, with a downwardly turned lip on its end further from the supplemental conveyor casing; a shovel box, secured to said floor section; an elevator casing, secured to the lower portion of the wall of the supplemental conveyor casing, and in open communication with said casing; an elevator, adapted to reciprocate in the elevator casing, and to transfer fuel from the supplemental conveyor casing to the shovel box; and screw conveyors, adapted to be coincidently rotated in the preliminary and supplemental conveyor casings.

8. In a conveying apparatus for mechanical stokers, the combination of an inclined preliminary conveyor casing; a supplemental conveyor casing, articulated, by a ball joint, thereto, and having a portion of the wall of its top formed into a section of a shovel box floor; a shovel box, secured to said floor section, and having one or more air passages in its wall; an elevator casing, secured to the lower portion of the wall of the supplemental conveyor casing, and in open communication with said casing; an elevator, adapted to reciprocate in the elevator casing, and to transfer fuel from the supplemental conveyor casing to the shovel box; and screw conveyors, adapted to be coincidently rotated in the preliminary and supplemental conveyor casings.

ADAM B. FAHNESTOCK.

Witnesses:
J. SNOWDEN BELL,
A. S. VANDERBILT.